United States Patent [19]

Stultz

[11] Patent Number: 5,272,717
[45] Date of Patent: Dec. 21, 1993

[54] SINGLE FOCUS BACKWARD RAMAN LASER

[75] Inventor: Robert D. Stultz, Huntington Beach, Calif.

[73] Assignee: Hughes Aircraft Company, Los Angeles, Calif.

[21] Appl. No.: 822,374

[22] Filed: Jan. 17, 1992

[51] Int. Cl.$^5$ .............................. H01S 3/30
[52] U.S. Cl. .......................... 372/3; 372/9; 372/98; 372/101; 372/99; 359/327
[58] Field of Search ............ 372/3, 101, 9, 98, 99; 359/327

[56] References Cited

U.S. PATENT DOCUMENTS 5,058,117 10/1991 Shoshan et al. ................ 372/3
5,090,016 2/1992 Denhirst et al. ................ 372/3

*Primary Examiner*—Léon Scott, Jr.
*Attorney, Agent, or Firm*—Michael W. Sales; Wanda K. Denson-Low

[57] ABSTRACT

A single focus backward Raman laser that is a compact, efficient apparatus for converting light at a first wavelength provided by a pump laser to light at a Raman-shifted wavelength. The laser is comprised of a gas cell, two lenses, a feedback mirror, an optical isolator, and a dichroic mirror, and the gas cell contains a Raman gas medium. The Raman gas medium may be methane, hydrogen, or deuterium, for example. The two lenses bring the pump and Raman light to a single focus in the gas cell and also recollimate the light after it exits the cell. The optical isolator is used to prevent the backward-scattered pump light from reentering the pump laser. The dichroic mirror is used to reflect out the backward-scattered Raman light, while transmitting the pump laser light. The present laser has a much improved beam divergence and is much less sensitive to optical misalignments than conventional Raman half-resonator designs. The present laser is also less complex and is more compact than a multiple focus backward Raman laser, with substantially identical Raman conversion efficiency and beam divergence. The present laser is adapted to replace the Raman half-resonator and the multiple focus backward Raman laser in high pulse repetition rate (>1 Hz), medium-energy ($\leq$100 mJ, 1.54 $\mu$m) eyesafe laser designs.

7 Claims, 2 Drawing Sheets

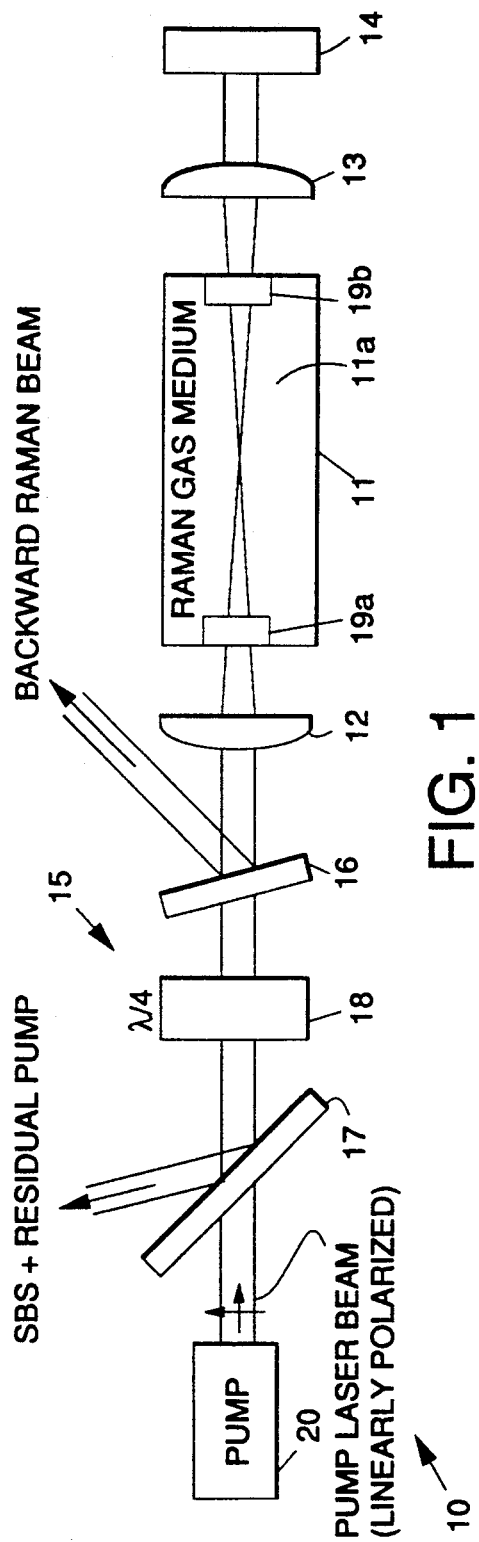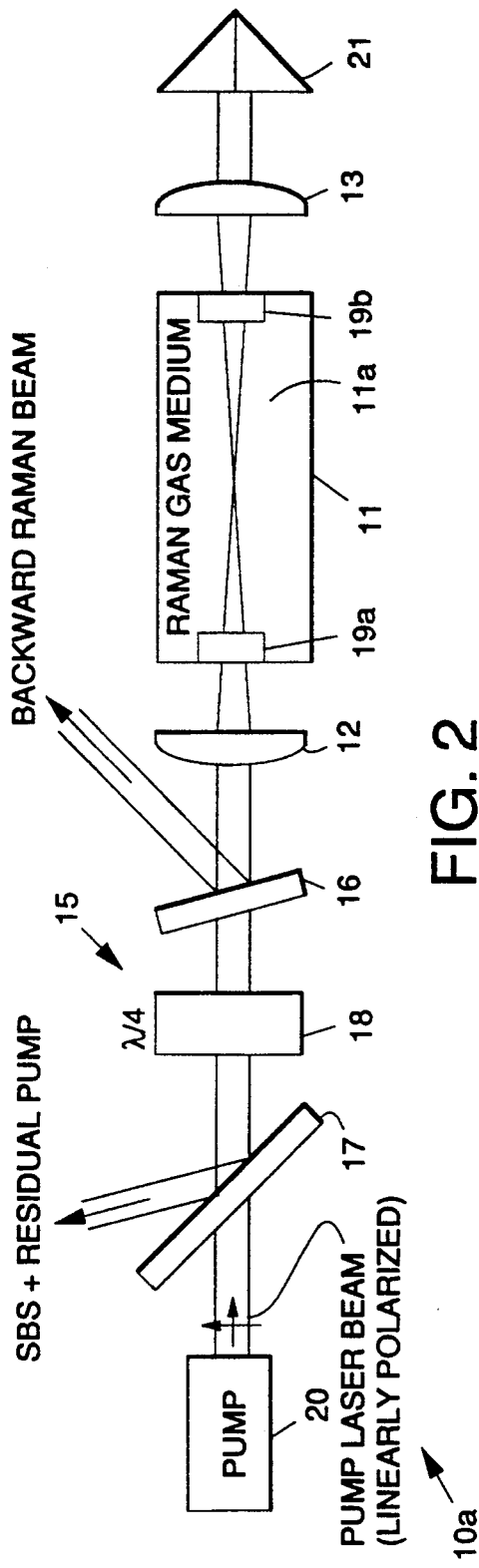

SINGLE FOCUS BACKWARD RAMAN LASER

BACKGROUND

The present invention relates generally to lasers, and more particularly, to a single focus backward Raman laser.

The present design for eyesafe Raman lasers incorporates a Raman half-resonator. This design is very sensitive to pump laser resonator mirror misalignment. In addition, the Raman beam divergence is much worse than that of the pump (typically two times worse). Backward Raman lasers on the other hand, have much better Raman beam divergence (typically no worse than 20 to 30% greater than the pump). They are also less sensitive to optics misalignment. A multiple focus backward Raman laser, which was a previous backward laser design of the assignee of the present invention, is relatively large and has more parts than the conventional half-resonator design. Also, the gas at each focus must be circulated for pulse repetition frequencies of greater than about 10 Hz. This last fact greatly increases the complexity and cost of the multiple focus backward Raman laser for laser systems with pulse repetition frequency requirements of greater than 10 Hz.

Therefore, it would be an advantage to have an efficient backward Raman laser that is less complex and more compact than a multiple focus backward Raman laser, and which provides substantially identical Raman conversion efficiency and beam divergence.

SUMMARY OF THE INVENTION

In order to provide for the above and other advantages, the present invention comprises a single focus backward Raman laser that is a compact, efficient apparatus for converting light at a first wavelength provided by a pump laser to light at a Raman-shifted wavelength. The laser of the present invention is comprised of a single gas cell, two lenses, a feedback mirror, an optical isolator, and a dichroic mirror. The gas cell contains a Raman gas medium. The Raman gas medium may be methane, hydrogen, or deuterium, for example. The two lenses bring the pump and Raman light to a single focus in the gas cell and also recollimate the light after it exits the cell. The feedback mirror is highly reflective at both the pump and the Raman-shifted wavelengths. The optical isolator is used to prevent the backward-scattered pump light from reentering the pump laser. The dichroic mirror is used to reflect out the backward-scattered Raman light, while transmitting the pump laser light.

In operation, the pump laser beam makes two passes through the Raman medium due to the feedback mirror and the optical isolator. The pump light that is not converted to Raman-shifted light on the first pass is reflected back through the focus. This two-pass arrangement is believed to be the major reason why the single focus backward Raman laser works as well as the multiple focus backward Raman laser described in the Background section above. The feedback mirror also reflects any Raman scattered light incident on it such that it passes back through the focus in the gas cell. This reflected Raman light then becomes a seed for amplification by stimulated Raman scattering when it passes through the Raman medium. Most of the pump-to-Raman conversion occurs during the first pass of the pump beam.

The present single focus backward Raman laser has a much improved beam divergence and is much less sensitive to optical misalignments than the conventional Raman half-resonator designs. The present laser is also less complex and more compact than the multiple focus backward Raman laser, with substantially identical Raman conversion efficiency and beam divergence. The present laser provides a very compact means for achieving efficient Raman conversion with a Raman beam divergence that is close to that of the pump laser. The present laser is adapted to replace the Raman half-resonator and multiple focus backward Raman laser in high pulse repetition rate (>1 Hz), medium-energy (<100 mJ, 1.54 μm) eyesafe laser designs.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 illustrates a first embodiment of a single focus backward Raman laser in accordance with the principles of the present invention that incorporates plane mirror feedback;

FIG. 2 illustrates a second embodiment of a single focus backward Raman laser in accordance with the principles of the present invention that incorporates retroreflector (corner cube) feedback;

DETAILED DESCRIPTION

Figure 3:
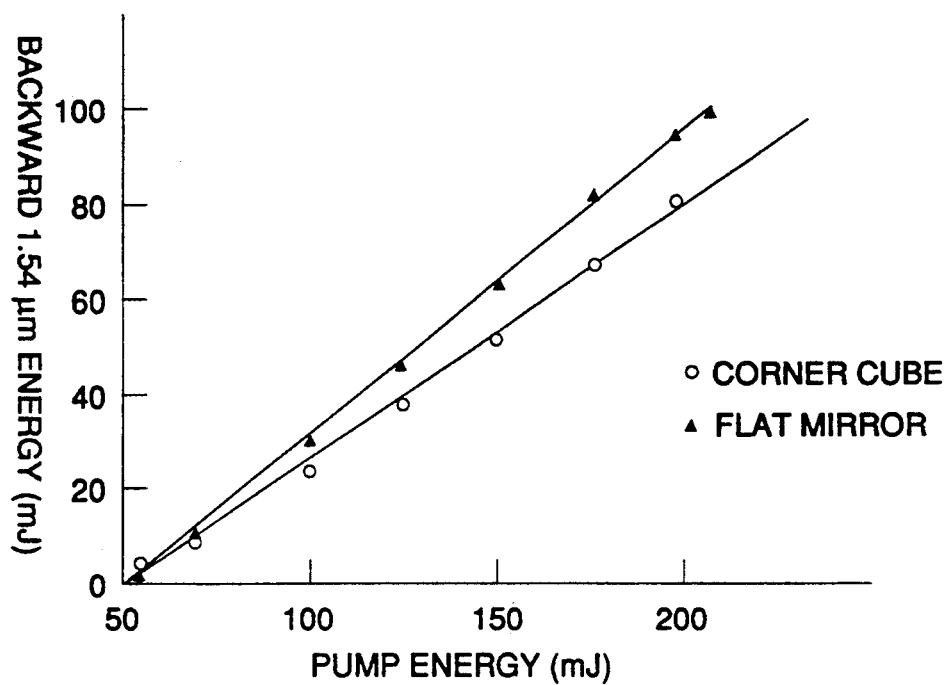
FIG. 3 illustrates a graph showing the backward Raman output energy versus pump input energy for two types of feedback mirrors.

Referring to the drawing figures, FIG. 1 illustrates a first embodiment of a single focus backward Raman laser 10 in accordance with the principles of the present invention that incorporates plane mirror feedback, while FIG. 2 illustrates a second embodiment of a single focus backward Raman laser 10a in accordance with the principles of the present invention that incorporates retroreflector (corner cube) feedback. The schematics shown in FIGS. 1 and 2 illustrate laboratory breadboards of the present invention that were built and tested.

The laser 10 comprises a single gas cell 11, two lenses 12, 13, a feedback mirror 14, an optical isolator 15, and a dichroic mirror 16. The laser 10 is adapted to convert light at a first wavelength provided by an external pump laser 20 into light at a Raman-shifted wavelength. The gas cell 11 contains a Raman gas medium such as methane, hydrogen, or deuterium, for example. The gas cell 11 is disposed along an optical path. The first and second lenses 12, 13 are disposed at opposite ends of the gas cell 11 along the optical path and are adapted to focus laser light within the cell 11. The feedback mirror 14 is disposed along the optical path adjacent the first lens 12 and forms one end of a laser cavity. The optical isolator 15 is disposed along the optical path adjacent the second lens 13 and forms a second end of the laser cavity. The optical isolator 15 is adapted to reflect backward propagating stimulated Brillouin scattered light and residual pump laser wavelength light reflected from the feedback mirror 14 out of the laser cavity to prevent the backward-scattered light from reentering the pump laser 20. The dichroic mirror 16 is disposed along the optical path between the optical isolator 15 and the second lens 13 and is adapted to reflect backward propagating light at the Raman-shifted wavelength out of the laser 10.

The gas cell 11 contains a Raman gas medium 11a, such as methane, hydrogen, or deuterium, for example. Two Raman cell windows 19a, 19b are disposed at either end of the cell 11. The two Raman cell windows 19a, 19b confine the Raman medium 11a, which in the present invention is a high pressure gas, within the cell 11. The external pump laser 20 is employed to provide a pump laser beam as an input to the present laser 10. The dichroic mirror 16 is used to reflect out backward-scattered Raman light, while transmitting pump laser light. The two lenses 12, 13 are both positive lenses that focus light within the cell 11. The two lenses 12, 13 bring the pump and Raman light to a single focus in the gas cell 11 and also recollimate the light after it exits the cell 11. The feedback mirror 14 may be a flat mirror that is coated to be highly reflective at both the pump laser and Raman-shifted wavelengths. The feedback mirror 14 reflects both the pump and Raman radiation back through the focus created by the two lenses 12, 13. The optical isolator 15 may be comprised of a polarizer 17 and a quarter-wave plate 18. The optical isolator 15 is used to prevent the backward-scattered pump beam from reentering the external pump laser 20. This backward scattered pump beam includes stimulated Brillouin scattered (SBS) light from the Raman cell 11 and residual (unconverted) pump light reflected by the feedback mirror 14.

In operation, the pump beam provided by the pump laser 20 enters the laser 10 (from the left in FIG. 1). The pump beam passes through the polarizer 17 and the quarter-wave plate 18. These two components isolate the pump laser 20 from the Raman cell 11 and feedback mirror 14, in order to reflect the back-reflected pump radiation before it reenters the external pump laser 20. Other means of isolation, such as a Faraday rotator, for example, may also be employed, and work just as well as the disclosed isolator 15. The dichroic mirror 16 transmits the pump radiation but reflects the Raman radiation. The lenses 12, 13 form a focus in the Raman cell 11 so that the pump beam intensity is high enough to reach threshold for stimulated Raman scattering (SRS).

The single focus backward Raman laser 10 causes two passes of the pump beam through the Raman cell 11 due to the feedback mirror 14 and the isolator 15 described above. Any forward Raman scattered radiation (Raman radiation propagating in the same direction as the pump radiation) that is formed during the first pass of the pump radiation is reflected by the feedback mirror 14 and passes through the focus created by the two lenses 12, 13 for amplification. Also, any backward Raman scattered radiation that is formed during the second pass of the pump radiation also reenters the cell 11 for amplification. Most of the Raman conversion occurs in the backward direction during the first pass of the pump radiation, with the previously mentioned Raman radiation acting as a seed. This two-pass configuration is more efficient in converting pump to Raman radiation than a single-pass configuration.

The pump laser 20 used to test the single focus backward Raman laser 10 was a multimode Nd:YAG laser with an output energy of up to 200 mJ and a wavelength of 1.064 $\mu$m. The pump beam was approximately 3 to 3.5 times diffraction limit (approximately 6 mm beam diameter and 1.4 mrad beam divergence). The full width half maximum (FWHM) pulsewidth was 15 nanoseconds.

One Raman gas 11a used in the laser 10 is methane ($CH_4$). Methane has a vibrational Raman shift of 2915 $cm^{-1}$, which converts 1.064 $\mu$m light to 1.54 $\mu$m. This latter wavelength is considered eyesafe. For pulse repetition frequencies <1 Hz, Raman conversion efficiencies of greater than 50% (approximately 75% quantum efficiency) were observed with the single focus backward Raman laser. Also, Raman beam divergences that were slightly better than the pump laser 20 were observed. Taking into account the wavelength difference, the Raman beam quality was actually much better (closer to diffraction limit) than the pump laser 20.

The present laser 10 was tested at a 20 Hz pulse repetition frequency. The Raman conversion efficiency was approximately the same as at low pulse repetition frequencies (<1 Hz). The Raman beam divergence relative to the pump laser 20 for Raman output energies of <50 mJ was also about the same as at low pulse repetition frequencies. At 20 Hz, however, the Raman beam divergence began to degrade for Raman outputs of >50 mJ. This was due to the limitations of the gas circulation method used in the Raman cell 11 and not the present laser 10. The Raman conversion efficiency at 25 Hz was nearly as good as at 20 Hz, but the beam divergence was worse also because of the limitations of the gas circulation scheme.

The present laser 10 is a compact, efficient apparatus for converting a pump laser wavelength to a Raman-shifted wavelength. The pump laser beam makes two passes through the Raman medium 11a due to the use of the feedback mirror 14 and the optical isolator 15. The pump light that is not converted to Raman-shifted light on the first pass is reflected back through the focus created by the two lenses 12, 13. This two-pass arrangement is believed to be the primary reason why the single focus backward Raman laser 10 works as well as the multiple focus backward Raman laser described in the Background section.

The single focus backward Raman laser 10 has a much improved beam divergence and is much less sensitive to optical misalignments than current Raman half-resonator designs. The single focus backward Raman laser 10 has the same improved Raman beam divergence as the multiple focus backward Raman laser, but is less complex, more compact, and has only one focus to circulate. The single focus backward Raman laser also has the same Raman conversion efficiency as the multiple focus backward Raman laser.

The present laser 10 is adapted to replace the Raman half-resonator and multiple focus backward Raman lasers in high pulse repetition rate (>1 Hz), medium-energy (50 to 100 mJ, 1.54 $\mu$m) eyesafe laser designs. The single focus backward Raman laser 10 provides a very compact means for achieving efficient Raman conversion with a Raman beam divergence that is close to that of the pump laser.

FIG. 2 illustrates a second embodiment of a single focus backward Raman laser 10a in accordance with the principles of the present invention. The primary difference between the first and second embodiments of the laser 10, 10a is the use of a retroreflector 21, such as a corner cube, as the feedback mirror in the second embodiment. The retroreflector 21 reflects 100% of both the pump beam and Raman wavelengths due to total internal reflection. The retroreflector 21 reflects both the pump and Raman radiation back through the focus created by the two lenses 12, 13. The feedback provided by the retroreflector 21 is retroreflective and insensitive to angular misalignment.

This second embodiment of the present laser 10a was found to be slightly less efficient using the retroreflector 21 rather than the flat mirror feedback arrangement. The reason for this is that the retroreflector 21 depolarizes both the pump and Raman light to some extent. Raman scattered light that is not the same polarization as the pump light experiences no gain. However, the corner cube feedback scheme of FIG. 2 provides slightly better Raman beam divergence than the flat mirror feedback scheme of FIG. 1, and is insensitive to misalignment.

Although a working laser has not yet been built, it appears that the laser 10 may also employ deuterium ($D_2$) in place of methane as the Raman gas 11a. Deuterium has nearly the same vibrational Raman shift but has better thermal properties than methane. Tests have been conducted to demonstrate that lower refractive index distortion and greater thermal diffusivity may be obtained by using deuterium gas as the Raman shifting medium 11a instead of methane. Nd:YAG Raman shifting in deuterium provides 1.56 $\mu$m laser light, and the medium will provide for much greater pulse rate operation, with a simpler Raman cell configuration.

In order to better understand the operation of the present invention, principles of Raman scattering will now be discussed in some detail. Raman scattering is a two-photon, inelastic scattering of light. Vibrational Raman scattering is discussed below. Raman scattering is a process wherein a pump photon is absorbed and a Raman photon of lesser energy is simultaneously emitted leaving the molecule in an excited state. The frequency of the Raman photon is given by $$\omega_2 = \omega_1 - \Delta E/h = \omega_1 - \omega_\nu \qquad (1)$$

where $\Delta E$ is the energy difference between the initial and final states of the molecule. The Raman shift, $\omega_\nu$, is a characteristic of the particular Raman medium used. The terms $\omega_1$ and $\omega_2$ are pump and Raman photon frequencies, respectively.

At low pump intensities, only spontaneous Raman scattering occurs and therefore only an extremely small amount of Raman energy is produced. As the pump intensity is increased, the amount of Raman energy detected will at some point begin to increase nonlinearly due to stimulated Raman scattering (SRS). When pump depletion is negligible, the Raman intensity as a function of position z along the pump beam is given by $$I_s(z) = I_s(0)e^{gI_p z} \qquad (2)$$

where g is the Raman gain coefficient and $I_p$ is the pump intensity. The gain coefficient depends on material parameters of the Raman medium $$g = \frac{\lambda_s^2 \lambda_p N}{cn_s^2 h\pi \Delta \nu} \left( \frac{\partial \sigma}{\partial \Omega} \right) \qquad (3)$$

where $\lambda_s$ and $\lambda_p$ are the Raman and pump wavelengths, respectively, N is the number density of molecules in the Raman gas, c is the speed of light in a vacuum, h is Plank's constant, $n_s$ is the refractive index at the Raman wavelength, $\Delta_\nu$ is the Half Width at Half Maximum (HWHM) Raman linewidth, and $\partial \sigma / \partial \Omega$ is the SRS cross section. In the case of a gas, $n_s \approx 1$.

Vibrational stimulated Raman scattering (SRS) can occur in either the backward or forward direction relative to the pump beam propagation. It has been experimentally found that backward Raman lasers have significantly improved Raman beam quality compared to forward Raman lasers. In some cases this can be a factor of 2 improvement. The reason for this may lie in the phase conjugate nature of the backward Raman beam. It has also been reported in the literature that forward Raman beam quality can be degraded due to the coupling of the Stokes and anti-Stokes radiation. This latter effect does not occur in backward Raman because the large phase mismatch with anti-Stokes radiation in that direction.

Since the backward beam is phase conjugate to the pump beam, the Raman output energy, beam quality, and beam direction are all very insensitive to misalignments or distortions of the Raman cell optics. This makes it easy to switch back and forth between the pump and Raman outputs when a two color laser system is desired.

Backward Raman lasers are very efficient, for example, greater than 50% conversion efficiency has been demonstrated using methane with a 200 MJ multimode pump. This corresponds to about 75% quantum efficiency. The divergences and near-field diameters of the pump and output Raman beams were identical. Given the wavelength difference, this means that the Raman beam was 1.5 times closer to diffraction limit.

A 20 Hz pulse repetition frequency, 50 mJ at 1.54 $\mu$m single-focus backward Raman cell has been developed in a very compact form. The cell is about nine inches long, and a corner cube feedback mirror is used. A 40% conversion efficiency was achieved with this design along with a Raman beam divergence only 1.1 times the pump laser divergence.

Figure 4:
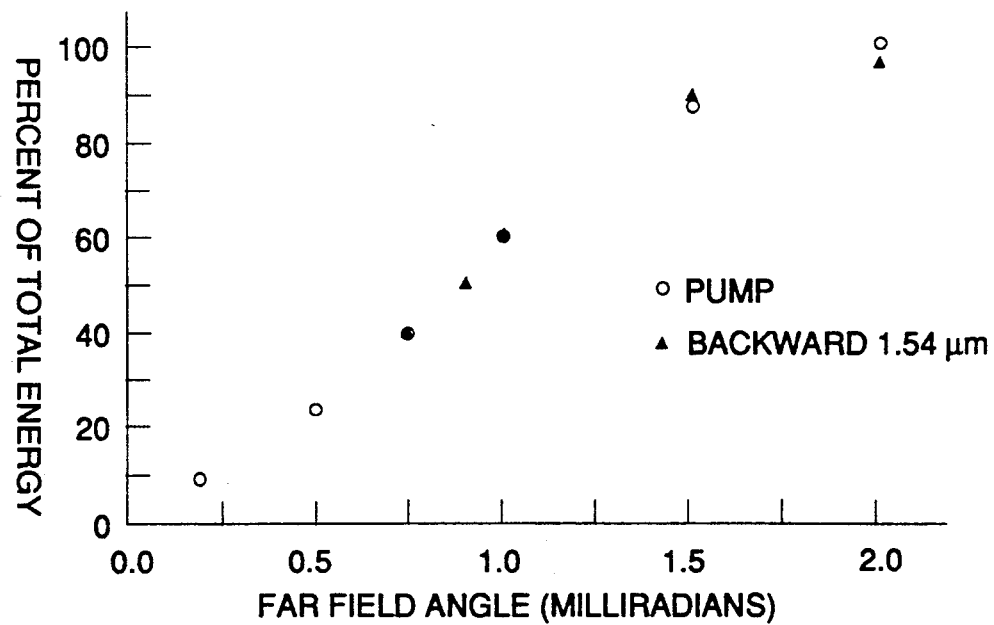
FIG. 4 illustrates a graph showing that the backward Raman beam divergence is almost identical to the divergence of the pump in the present invention.

FIG. 3 illustrates a graph showing the backward Raman output energy (at 1.54 $\mu$m) versus pump input energy (at 1.06 $\mu$m) for the two types of feedback mirrors employed in FIGS. 1 and 2. The triangular data points in FIG. 3 are for the flat mirror embodiment, while the circular data points in FIG. 3 are for the corner cube embodiment. FIG. 4 illustrates a graph showing that the backward Raman beam divergence is almost identical to the divergence of the pump in the present invention. The triangular data points in FIG. 4 are for the backward 1.54 $\mu$m energy, while the circular data points are for the pump laser. The backward Raman beam divergence of the present invention is nearly identical to that of the pump laser 20. The beam divergence of a conventional half-resonator is typically twice that of the pump laser in comparison. Both sets of data shown in FIGS. 3 and 4 were taken with methane gas and at 0.5 Hz pulse repetition frequency. The f/number of the lenses used was f/50, which was near optimum for beam divergence and conversion efficiency.

Hydrogen gas ($H_2$) was also tested in the present invention. The backward Raman output was at 1.9 $\mu$m since the Raman shift of $H_2$ is 4155 cm$^{-1}$ as compared with 2195 cm$^{-1}$ for methane. At least 37 millijoules of 1.9 $\mu$m energy were generated with a conversion efficiency of at least 21% (38% quantum efficiency). The conversion efficiency for $H_2$ can be made much better since none of the optics in the test were coated for 1.9 μm energy and there were a great deal of losses at that wavelength.

Thus there has been described a new and improved single focus backward Raman laser. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A single focus backward Raman laser for converting light at a first wavelength injected by a pump laser into a laser cavity to light at Raman-shifted wavelength, said laser comprising:

a gas cell having first and second opposing ends and containing a Raman gas medium disposed along an optical path;

first and second lens disposed adjacent the first and second ends of the gas cell along the optical path for focusing laser light within the cell;

a feedback mirror disposed along the optical path adjacent the first lens for forming one end of the laser cavity and for reflecting laser light backward through the gas cell;

an optical isolator disposed along the optical path between the pump laser and the second lens for forming a second end of the laser cavity and for reflecting backward propagating simulated Brillouin scattered light and residual pump laser wavelength light reflected form the feedback mirror out of the laser cavity to prevent the backward light form reentering the pump laser; and a dichroic mirror disposed along the optical path between the optical isolator and the second lens for reflecting backward propagating light at the Raman-shifted wavelength out of the laser cavity.

2. The single focus backward Raman laser of claim 1 wherein the optical isolator is comprised of a polarizer and a quarter-wave plate.

3. The single focus backward Raman laser of claim 1 wherein the feedback mirror is comprised of a plane mirror that is configured to be highly reflective at both pump laser and Raman-shifted wavelengths.

4. The single focus backward Raman laser of claim 1 wherein the feedback mirror is comprised of a corner cube retroreflector.

5. The single focus backward Raman laser of claim 1 wherein the Raman gas is comprised of methane.

6. The single focus backward Raman laser of claim 1 wherein the Raman gas is comprised of hydrogen.

7. The single focus backward Raman laser of claim 1 wherein the Raman gas is comprised of deuterium.

* * * * *